(12) United States Patent
Liu et al.

(10) Patent No.: US 7,106,566 B2
(45) Date of Patent: Sep. 12, 2006

(54) POWER ADAPTER INTERFACE CIRCUITRY FOR PROTECTING A BATTERY OPERATED SYSTEM

(75) Inventors: Kwang H. Liu, Sunnyvale, CA (US); Sorin Negru, San Jose, CA (US); George Hsieh, Taipei (TW); Jacky Chen, Taipei (TW); Frank Shih, Tam-Shuei (TW); Scott Wu, Keelung (TW)

(73) Assignee: Arques Technology, Santa Clara, CA (US)

( * ) Notice: Subject to any disclaimer, the term of this patent is extended or adjusted under 35 U.S.C. 154(b) by 565 days.

(21) Appl. No.: 10/615,458

(22) Filed: Jul. 8, 2003

(65) Prior Publication Data

US 2005/0007711 A1    Jan. 13, 2005

(51) Int. Cl.
*H02H 3/00* (2006.01)
(52) U.S. Cl. ........................................................ 361/90
(58) Field of Classification Search ................. 361/90
See application file for complete search history.

(56) References Cited

U.S. PATENT DOCUMENTS

| | | | | |
|---|---|---|---|---|
| 4,439,821 A | * | 3/1984 | Grippe | 363/26 |
| 5,371,456 A | * | 12/1994 | Brainard | 320/161 |
| 6,204,714 B1 | * | 3/2001 | Milshtein et al. | 327/299 |
| 6,313,611 B1 | * | 11/2001 | Mowry et al. | 320/136 |
| 6,495,995 B1 | | 12/2002 | Groom et al. | 323/283 |

* cited by examiner

*Primary Examiner*—Stephen W. Jackson
(74) *Attorney, Agent, or Firm*—Pillsbury Winthrop; Shaw Pittman LLP

(57) ABSTRACT

An integrated circuit (IC) has logic and timing circuits that are coupled to discrete circuitry to provide protection and indications whenever an AC adapter that is faulty or has improper voltage levels or polarity are plugged into a system. In particular, the IC device provides over-voltage, under-voltage, and reversed-polarity protections to an electronic system to keep the electronic system from being damaged by an alternating current (AC) adapter having an improper voltage range or voltage polarity. It also provides a protection that prevents an adapter from powering a host system that has a short-circuit fault.

36 Claims, 5 Drawing Sheets

POWER ADAPTER INTERFACE CIRCUITRY FOR PROTECTING A BATTERY OPERATED SYSTEM

TECHNICAL FIELD

The present invention generally relates to a protection device for a battery-powered electronic system. In particular, it relates to an integrated circuit (IC) device providing over-voltage, under-voltage, and reversed-polarity protections to an electronic system to keep the electronic system from being damaged by an alternating current (AC) adapter having an improper voltage range or voltage polarity. It also provides a protection that prevents an adapter from powering a host system that has a short-circuit fault.

BACKGROUND INFORMATION

There are many types of electronic systems powered by AC to direct current (DC) adapters including, printers, scanners, liquid crystal display (LCD) monitors, personal computer (PC) speakers, digital subscriber line (DSL) modems, etc. There are also many types of portable electronic systems that may be powered by either internal batteries or AC adapters, such as cellular phones, digital cameras, compact disc (CD) players, portable computers, and pocket computers.

There is a substantial likelihood that an adapter designed for one system having a particular voltage level may be accidentally plugged into another system with a different voltage level. An adapter with a high voltage level or a reversed polarity connector could cause severe damage if it is used to power a non-compatible host system. In certain cases, it may also result in safety hazards to a user.

Many prior art protection circuits that were designed to prevent powering a system with an incompatible adapter used a myriad of discrete components including diodes, fuses, zener diodes, and solid-state relays to provide a system protection from receiving power from incompatible voltage levels or voltage polarities. In addition, most prior art protection schemes lacked reliable anti-bounce circuitry. Intermittent contact or bouncing contacts during the initial plug-in period often leads to false triggering of the protection circuitry. Furthermore, the prior art protection schemes generally do not provide a proper interface that prevents a host system from being coupled to an adapter with incompatible voltage levels or polarities. The prior protection devices or circuits simply disable or electrically disconnect the adapter from the host system. A system user is not informed that they are using an incompatible type of adapter. There is, therefore, a need for an active protection device that can inform the host system in the event a user plugs an incompatible AC adapter into the system.

SUMMARY OF THE INVENTION

Adapter interface circuitry has series connected first and second electronic switches for coupling an adapter output voltage to a system power input. A sense voltage is generated that is proportional to the adapter output voltage. Likewise, a capacitor is charged to a capacitor voltage if the adapter output voltage has a preferred polarity. A battery, with internal short circuit protection, is coupled to the system power input with a third electronic switch. In one embodiment of the present invention, an integrated circuit (IC) contains the circuitry for generating controls for the switches as well as generating signal outputs. When the capacitor voltage exceeds a predetermined value, two timers are enabled and started, and a shutdown latch is enabled. The sense voltage is used in a window comparator to determine if the adapter voltage is within a predetermined range. When the adapter voltage output is within the predetermined range, a power correct signal is generated indicating an in-range adapter output voltage condition. If the adapter output voltage is not in-range, then the shutdown latch is set at the end of the first timer interval and a light emitting diode (LED) is turned ON indicating an out-of-range voltage condition. If the adapter output voltage is in-range and the second timer interval has not expired, then a first switch voltage within the series connected switches is coupled to the system input to determine if there is a short circuit condition within the system. If the first switch voltage is below a predetermined level after the second timer interval, then the shutdown latch is again set indicating a fault condition. If the adapter output voltage is within a desired range and there is no short circuit condition after the second timer interval, then the first and second electronic switches are turned ON thereby coupling the adapter output voltage to the system power input. Likewise, the third electronic switch is turned OFF decoupling the battery from the system power input.

In another embodiment of the present invention, an emitter current is generated in a grounded base bipolar NPN transistor when the adapter output voltage is a reverse polarity. This current flows through a resistor in the collector of the NPN transistor and generates a collector voltage. The NPN transistor saturates and clamps the collector voltage thus keeping it from going too far below ground. The collector of the NPN transistor is coupled to a logic inverter which generates a reversed voltage alert signal indicating that a reversed polarity adapter has been coupled to the adapter interface circuitry.

The foregoing has outlined rather broadly the features and technical advantages of the present invention in order that the detailed description of the invention that follows may be better understood. Additional features and advantages of the invention will be described hereinafter, which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
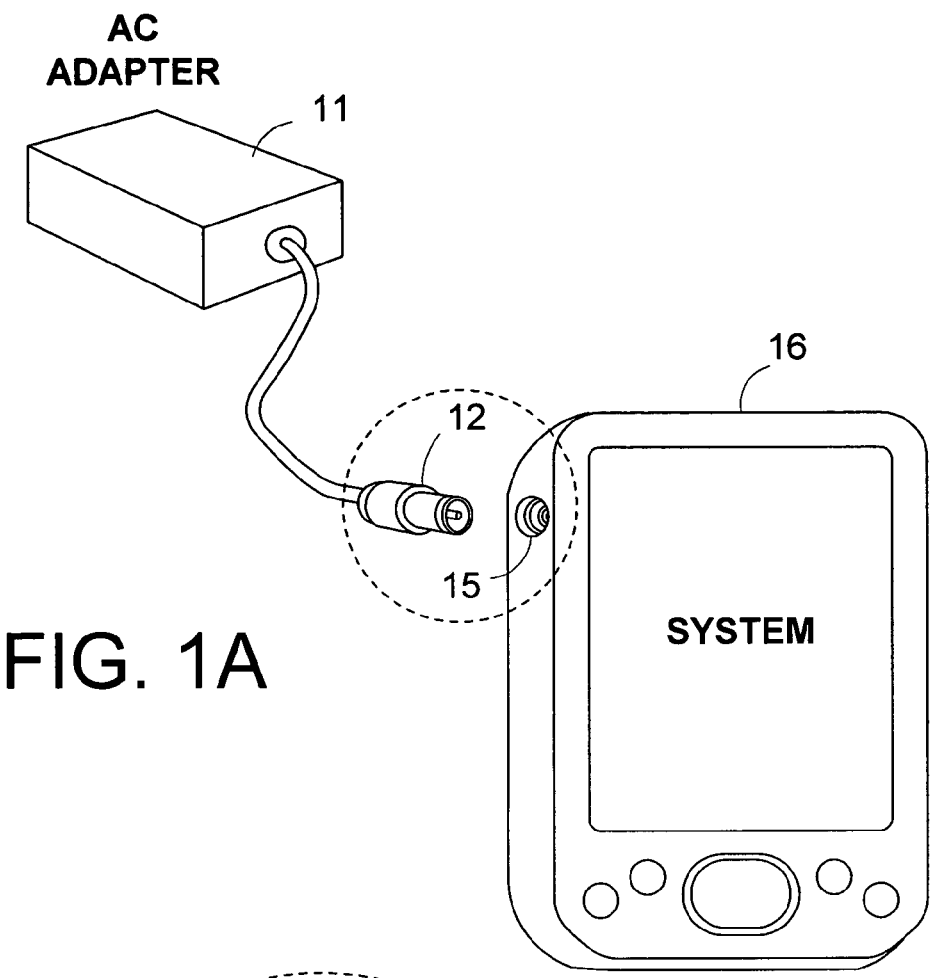
FIG. 1A illustrates an AC adapter and a host system while highlighting the adapter connector and the system adapter receptacle for mating with the adapter connector.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. In the following descriptions, the terms alternating current (AC) adapter may be used interchangeable with the term adapter. While an AC adapter may be the most used with battery powered systems, adapters from other voltage sources may be used and still be within the scope of the present invention.

Different types of electronic systems use different standard adapter voltages. Most cellular phones, hand-held computers and pocket computers use 5-volt AC adapters (hereafter adapters) while laptop computers use 16-volt to 20-volt adapters. Printers and LCD monitors often use 12-volt to 15-volt adapters. Most standard adapter plugs have a round shape with two coaxial metal contacts. Some standard adapter plugs have the positive voltage potential connected to the outside coaxial contact with the return or negative voltage potential connected to the inside coaxial contact. Other standard adapters have the polarity of the voltage potentials connected to the coaxial contacts in the opposite manner.

Figure 1B:
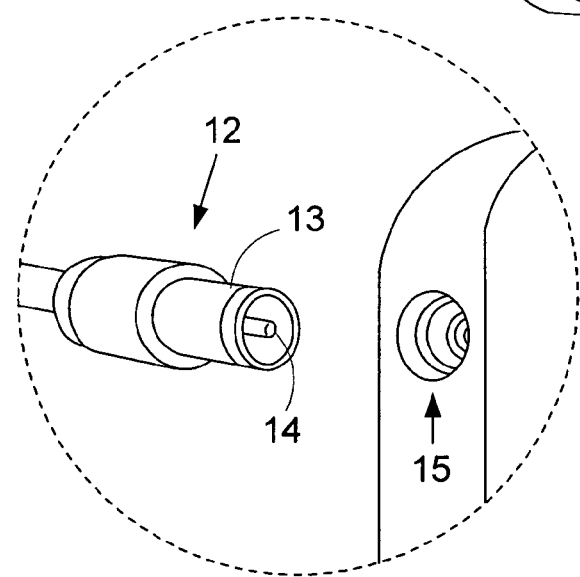
FIG. 1B is an expanded view of the adapter plug and the system adapter receptacle.

FIG. 1A illustrates a typical AC adapter 11 and a system 16. AC adapter 11 provides power to system 16 via adapter plug 12 when inserted into receptacle 15. FIG. 1B shows an enlarged view of adapter plug 12 and receptacle 15. Adapter plug 12 has coaxial contacts, outside contact 13 and an inside contact 14.

Figure 2A:
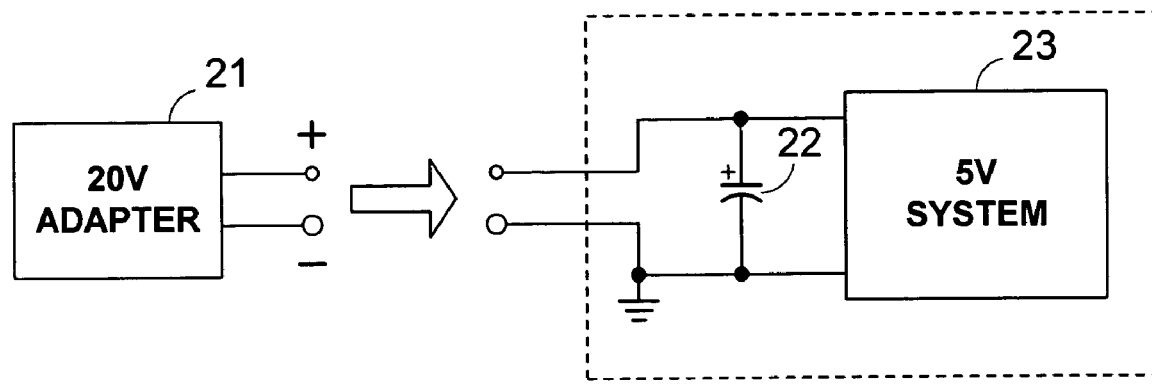
FIG. 2A illustrates a 20-volt adapter being plugged into a 5-volt system.

FIG. 2A illustrates a higher voltage (e.g., 20-volts) adapter 21 being plugged into a 5-volt system 23. The 20-volt level of adapter 21 may cause damages to capacitor 22 and system 23 when coupled.

Figure 2B:
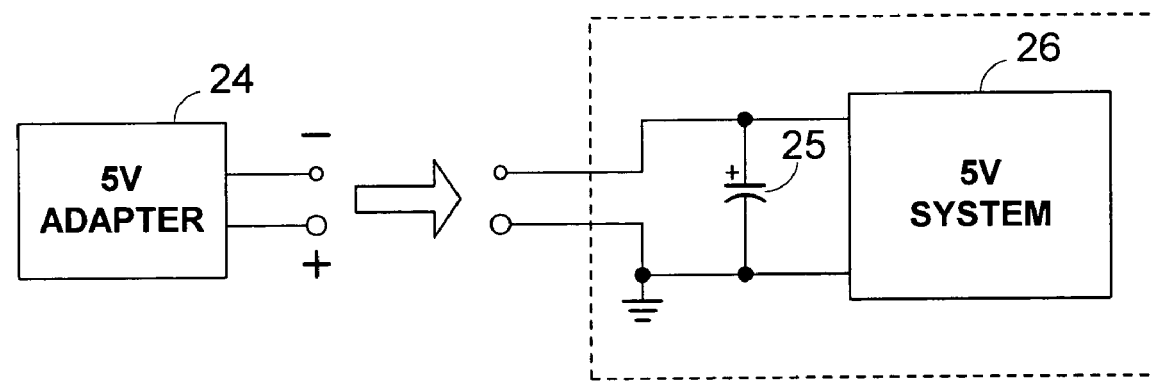
FIG. 2B illustrates a 5-volt adapter with a reverse polarity being plugged into a 5-volt system.

FIG. 2B illustrates a 5-volt adapter 24 with a reversed polarity being plugged into a 5-volt system 26. System 26 would experience a negative 5-volt input voltage level if coupled to 5-volt adapter 26. Again, this unexpected negative input voltage may cause damages to capacitor 25 and system 26.

Figure 3:
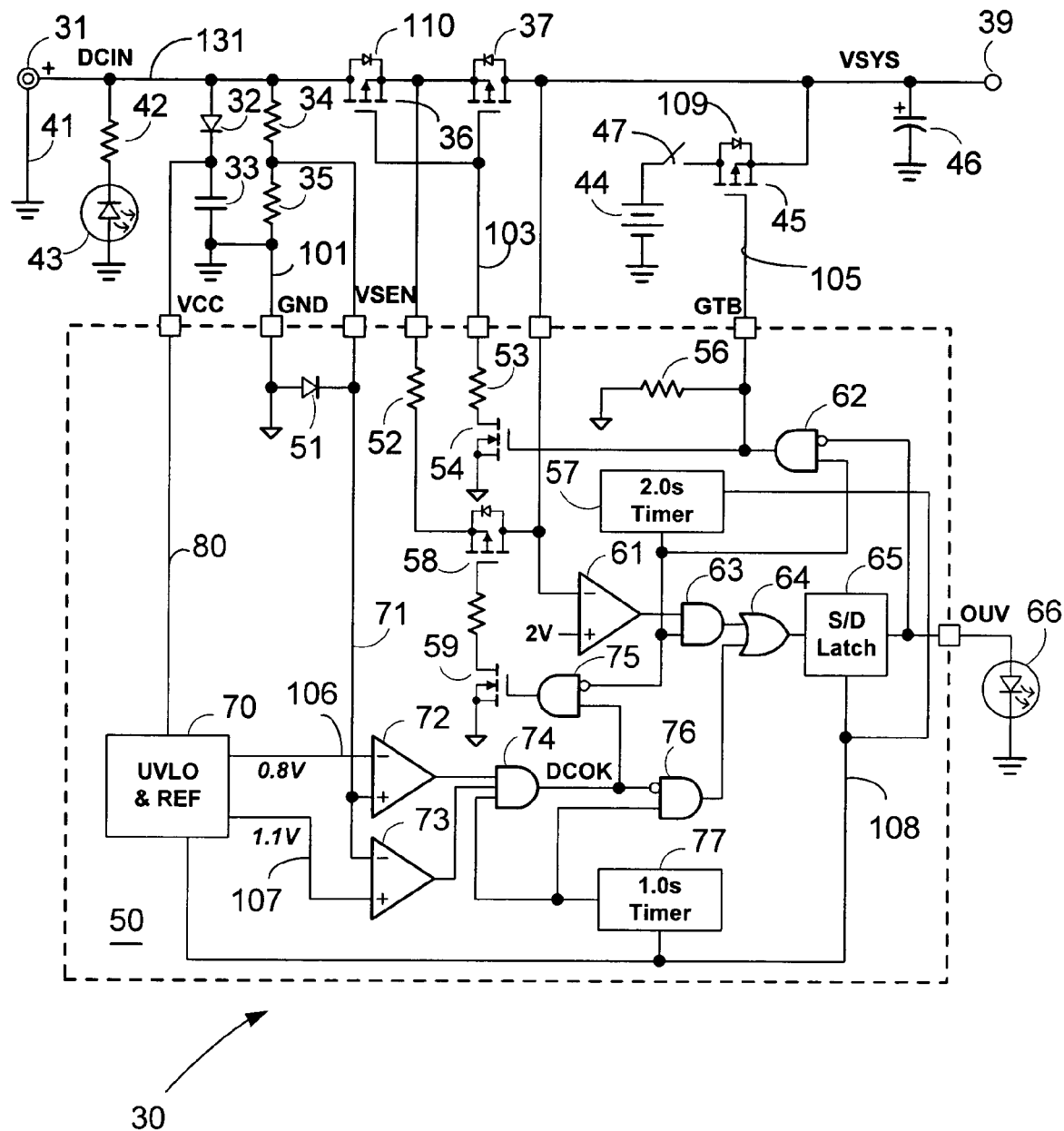
FIG. 3 is a circuit diagram of adapter interface circuits according to an embodiment of the present invention where an alert signal drives a light-emitting diode.

FIG. 3 is a circuit diagram of an embodiment of the present invention. Circuit 30 comprises a protection IC 50 and additional discrete circuitry. IC 50 comprises reversed-polarity detection circuitry, out-of-range protection circuitry, and short-circuit protection circuitry. IC 50 also comprises a shutdown latch circuit 65 and two timers 57 and 77. While IC 50 is shown to have all of the above circuitry, portions or all of this circuitry could also be implemented in discrete form and still be within the scope of the present invention.

The system voltage (VSYS) 39 is normally provided by internal battery 44 through a P-type MOSFET (PFET) 45. Internal battery 44 is equipped with its own short circuit protection switch 47 that is normally closed but opens in case of a high current condition indicative of a short circuit. If an AC adapter is unplugged, battery 44 via body diode 109 quickly powers VSYS 39 until the circuitry turns ON PFET 45. When a correct alternating current (AC) adapter (not shown) having a proper voltage and polarity is plugged in (via connector 31) to power a system (not shown) coupled to VSYS 39, IC 50 would normally turn OFF FET 45 and turn ON PFET 36 and PFET 37. When a correct voltage AC adapter is plugged in, its normal voltage DCIN 131 back biases body diode 109. At this point, VSYS 39 is powered by the voltage at DCIN 131. The details of the operation of the circuitry of FIG. 3 under all conditions are detailed in the following description.

With the correct adapter plugged in, reference and under-voltage lockout (UVLO) circuit 70 starts (via signal 108) the power up of IC 50. UVLO 70 generates two reference voltages, V 106 (0.8 volt) and V 107 (1.1 volt). The sense voltage VSEN 71 is coupled to the positive input of comparator 72 as well as to the negative input of comparator 73. The negative input of comparator 72 is coupled to V 106 and the positive input of comparator 73 is coupled to V 107. A voltage divider (shown as 5 to 1 in FIG. 3) comprising a resistor (R) 34 (40 k$\Omega$) and a resistor R 35 (10 k$\Omega$) scales down DCIN 131 to a lower voltage. AND gate 74, which receives the outputs of "window comparators" 72 and 73, goes to logic one only when DCIN 131 is between 4.0 volt and 5.5 volt (5 times 0.8 volts and 1.1 volts).

1.0-second timer 77 and a 2.0-second timer 57 are started by signal 108 when UVLO 70 is activated by the voltage on capacitor C 33 exceeding a turn on threshold. Shut down (SD) latch 65 is also started by signal 108. The 1.0-second blanking period of timer 77 delays the out-of-range protection circuit from acting on the initial plug-in condition of an adapter coupled to connector 31 during which the electrical contacts (not shown) may be intermittent and bouncing. After the 1.0-second blanking period, AND gates 76 and 74 are enabled (the output of timer 77 goes to logic one). If an out-of-voltage range condition from an plugged adapter is detected (the outputs of comparators 72 or 73 go to logic zero) after the 1.0-second blanking period, the output of AND gate 74 goes to logic zero causing the output of OR gate 64 to go to logic one setting SD latch 65 to logic one and turning ON light emitting diode (LED) 66 signaling an out-of-voltage range fault. The output of AND gate 62 is gated to logic zero by setting the output of SD latch 65 to logic one, thus turning OFF NFET 54 and thus PFETs 36 and 37. In this case, VSYS 39 remains connected to battery 44 via PFET 45.

When a correct input voltage from an adapter plugged into connector 31 is detected (DCOK transitions to a logic one) and after the 1.0-second blanking period, the output of AND gate 74 transitions to logic one. The output of timer 57 has a 2.0-second delay time from the start of UVLO 70 during which time it is a logic zero. Therefore, the output of AND gate 75 is at logic one during this period turning ON the pre-charge circuit comprising resistor 52, NFET 59, and PFET 58. DCIN 131 acts to charge VSYS 39 via resistor R 52, PFET 58 and the body diode 110 across PFET 36. The output of comparator 61 is enabled by a logic one at the output of timer 57 after its 2.0 second time out. If VSYS 39 has charged to more than 2 volts when output of timer 57 goes to logic one, then both inputs of OR gate 64 are low and the input of SD latch 65 is disabled and its output is logic zero enabling gate 62. When the output of timer 57 goes to logic one, NFET 54 turns ON and PFET 45 turns OFF. When NFET 54 turns ON, both PFETs 36 and 37 turn ON and DCIN 131 powers VSYS 39 (correct adapter).

After a 2.0-second delay of timer 57 from power up (signal 108), the output of timer 57 goes to logic one and enables the output of comparator 61 via AND gate 63, enabling the short circuit protection circuit comprising SD latch 65 and AND gate 62. It also turns OFF the pre-charging NFET 59 by disabling AND gate 75. If there is a short-circuit fault in the system, then VSYS 39 will not rise at all and the output of comparator 61 will be high after timer 57 enables AND gate 63. When the output of comparator 61 goes to logic one, it causes the output of AND gate 63 to go to logic one. OR gate 64 then goes to logic one and triggers SD latch 65 turning ON LED 66 signaling a short-circuit condition. However, if there is no short-circuit condition, VSYS 39 will be charged via R 52 and PFET 58 to above 2.0 volts by the time the 1.0-second pre-charge time has expired. The output of comparator 61 then goes to logic zero and SD latch 65 is not triggered. The output of AND gate 62 goes to logic one after the 2.0-second time turning OFF PFET 45 and turning ON NFET 54 and thus PFETs 36 and 37. The power source to VSYS 39 is switched from battery 44 to voltage DCIN 131.

If a reversed-polarity adapter is plugged into connector 31, a negative voltage will appear across R 42 and LED 43. The negative voltage causes LED 43 to turn ON. An ON LED 43 sends a visible signal to the user notifying the user of a fault condition. Additionally, diode 32 prevents capacitor 33 from being charged by a negative input voltage and clamping diode 51 prevents VSEN 71 from going below a negative 0.7 volt.

If DCIN 131 is a negative voltage, VCC 80 is not charged and IC 50 keeps power-up NFET 54 from turning ON since UVLO 70 will not be activated and signal 108 will not enable timers 57, 77 and SD latch 65. PFET 45 is kept ON by the action of the voltage of battery 44 and pull-down resistor R 56.

Figure 4:
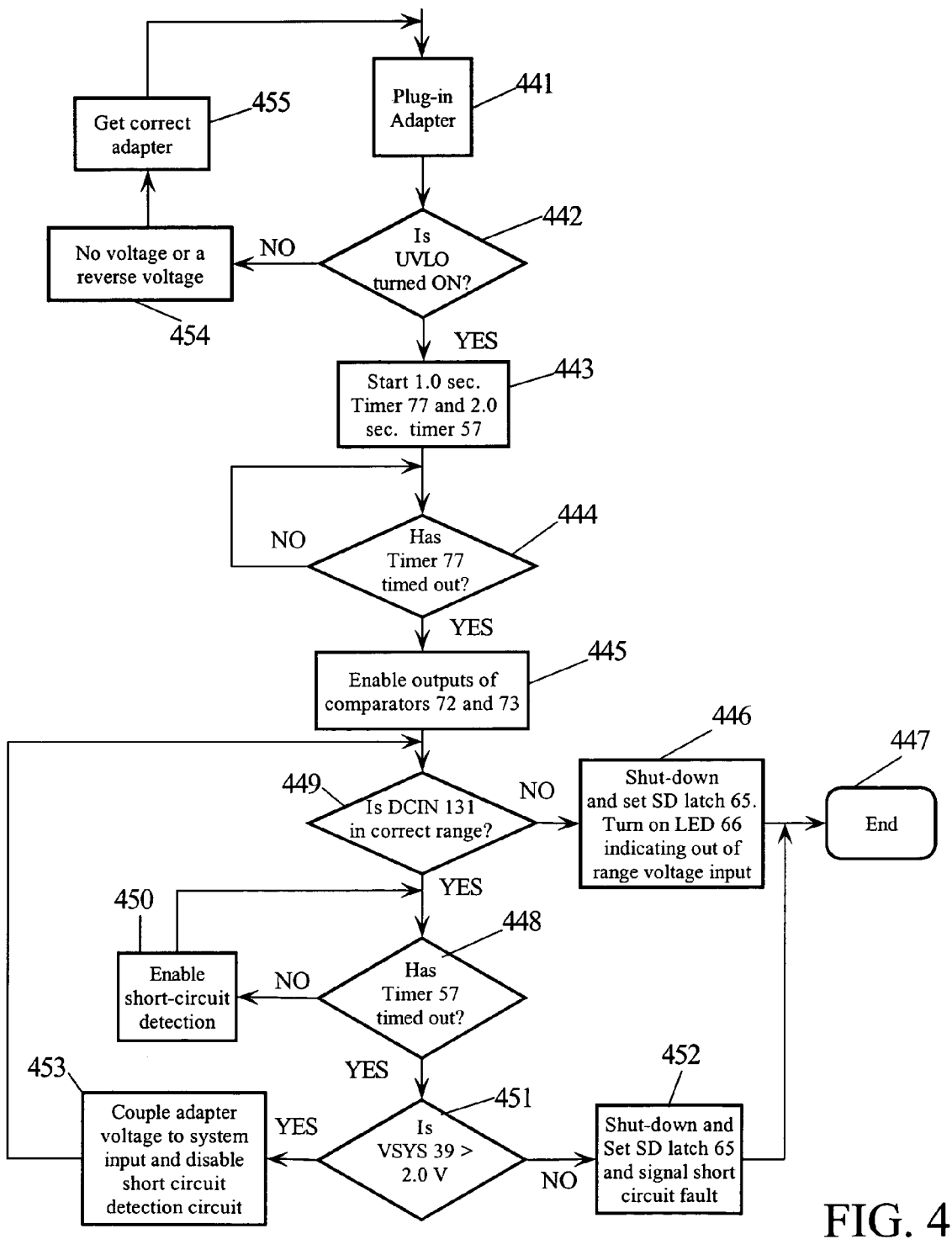
FIG. 4 is a flow diagram of the power up sequence for circuitry in the embodiment of FIG. 3.

FIG. 4 is a flow diagram of method steps performed by circuitry in embodiments of the present invention. In step 441 an adapter is plugged into the system. In step 442 a test is done to determine if the under voltage low voltage (UVLO) circuit is turned ON. If the result of the test in step 442 is NO, then in step 454 a determination is made whether there is no input voltage or the input voltage is reversed. In step 455, a user gets a correct functioning adapter and returns to step 441. If the result of the test in step 442 is YES, then in step 443, 1.0-second timer 77 and 2.0-second timer 457 are started. In step 444, a test is the done to determine if timer 77 has timed out. If the result of the test is NO, then a wait is executed. If the result of the test in step 444 is YES, then in step 445 the outputs of window comparators 72 and 73 are enabled. A test is done in step 449 to determine if the input voltage DCIN 131 is in the proper voltage range. If the result of the test in step 449 is NO, then in step 446 a shutdown is executed and SD latch 65 is set and an LED 66 is turned on indicating an out-of-range fault. Operation is then ended awaiting fault correction. If the result of the test in step 449 is YES, then in step 448 a test is done to determine if timers 457 are timed out. If the result of the test in step 448 is NO, then in step 450 NFET 59 and PFET 58 are turned ON enabling short circuit detection and a return is executed back to step 448. If the result of the test in step 448 is YES, then in step 451 a test is done to determine if input voltage VSYS 39 is greater than 2.0 volts. If the result of the test in step 451 is YES, then in step 453 PFETs 36 and 37 are turned ON coupling the adapter voltage to the system input and PFET 58 and NFET 59 are turned OFF disabling the short circuit detection. A branch is then taken back to step 449. A loop through steps 449, 448, 453, back to 449 will continue as long as the adapter remains plugged and conditions are correct. If the result of the test in step 451 is NO, then in step 452 a shutdown is executed and shutdown (SD) latch 65 is set to signal a short circuit fault. A branch is then taken to 447 where an END is executed awaiting a fix for the short circuit condition.

Figure 5:
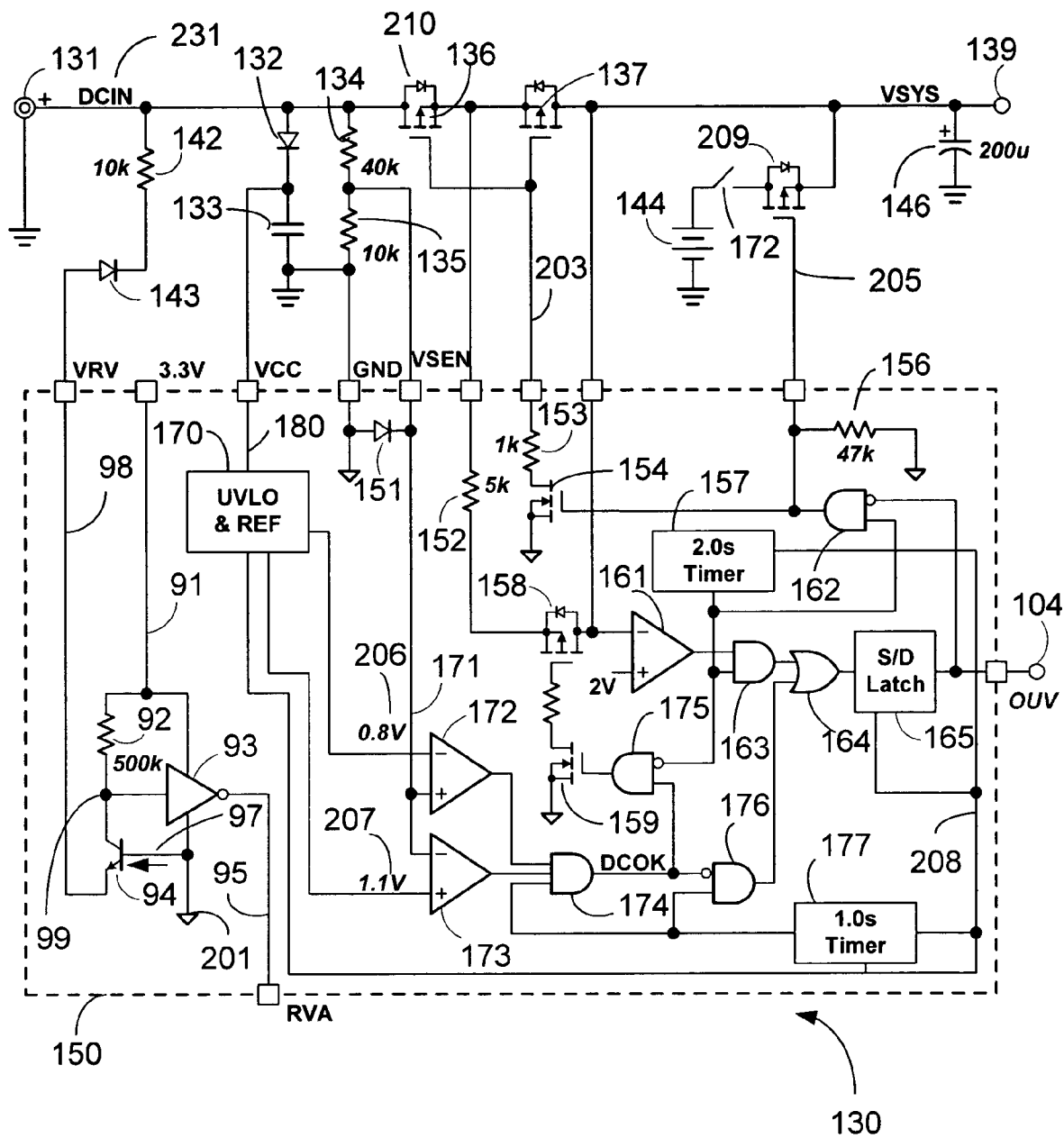
FIG. 5 is a circuit diagram of adapter interface circuits according to another embodiment of the present invention.

FIG. 5 is a circuit diagram of an embodiment of the present invention. Circuit 130 comprises a protection IC 150 and additional discrete circuitry. IC 150 comprises reversed-polarity detection circuitry, out-of-range protection circuitry, and short-circuit protection circuitry. IC 150 also comprises a shutdown latch circuit 165 and two timers 157 and 177. In addition to detecting out-of-range input voltage condition, a short-circuit condition, reversed-polarity faults and disconnecting a wrong adapter for the system, circuit 130 further comprises an out-of-range alert circuit and a reversed-polarity alert circuit. These alert circuits may notify an intelligent host system such as a laptop computer or a hand-held computer of the exact cause of the fault using signal states. After receiving an alert signal, the host system may in-turn signal a user that an improper adapter is plugged in to the system. While IC 150 is shown to have all of the above circuitry, portions or all of this circuitry could also be implemented in discrete form and still be within the scope of the present invention.

The system voltage (VSYS) 139 is normally provided by internal battery 144 through PFET 145. Internal battery 144 is equipped with its own short circuit protection switch 147 that is normally closed but opens in case of a high current condition indicative of a short circuit. If an AC adapter is unplugged, battery 144 via body diode 209 quickly powers VSYS 139 until the circuitry turns ON PFET 145. When a correct alternating current (AC) adapter (not shown) having a proper voltage and polarity is plugged in (via connector 131) to power a system (not shown) coupled to VSYS 139, IC 150 would normally turn OFF FET 145 and turn ON PFET 136 and PFET 137. When a correct voltage AC adapter is plugged in, its normal voltage DCIN 231 back biases body diode 209. At this point, VSYS 139 is powered by the voltage at DCIN 231. The details of the operation of the circuitry of FIG. 5 under all conditions are detailed in the following description.

With the correct adapter plugged in, reference and undervoltage lockout (UVLO) circuit 170 starts (via signal 208) the power up of IC 150. UVLO 170 generates two reference voltages, V 206 (0.8 volt) and V 207 (1.1 volt). The sense voltage VSEN 171 is coupled to the positive input of comparator 172 as well as to the negative input of comparator 173. The negative input of comparator 172 is coupled to V 206 and the positive input of comparator 173 is coupled to V 207. A voltage divider (shown as 5 to 1 in FIG. 5) comprising a resistor R 134 (40 kΩ) and a resistor R 135 (10 kΩ) scales down DCIN 231 to a lower voltage. AND gate 174, which is receiving the outputs of "window comparators" 172 and 173, goes to logic one only when DCIN 231 is between 4.0 volt and 5.5 volt (5 times 0.8 volts and 1.1 volts).

1.0-second timer 177 and a 2.0-second timer 157 are started by signal 208 when UVLO 170 is activated. The voltage on capacitor C 133 exceeding a turn on threshold activates UVLO 170. Shut down (SD) latch 165 is also started by signal 208. The 1.0-second blanking period of timer 177 delays the out-of-range protection circuit from acting on the initial plug-in condition of an adapter coupled to connector 131 during which the electrical contacts (not shown) may be intermittent and bouncing. After the 1.0-second blanking period, AND gates 176 and 174 are enabled (the output of timer 177 goes to logic one). If an out-of-voltage range condition from a plugged-in adapter is detected (the outputs of comparators 172 or 173 go to logic zero) after the 1.0-second blanking period, the output of AND gate 174 goes to logic zero causing the output of OR gate 164 to go to logic one setting SD latch 165 to logic one and turning ON LED 166 signaling an out-of-voltage range fault. The output of AND gate 162 is gated to logic zero by setting the output of SD latch 165 to logic one, thus turning OFF NFET 154 and thus PFETs 136 and 137. In this case, VSYS 139 remains connected to battery 144 via PFET 145.

In the case where a correct input voltage from an adapter plugged into connector 131) is detected (DCOK is a logic one) and after the 1.0-second blanking period, the output of AND gate 174 goes to logic one. The output of timer 157 has a 2.0-second delay time from the start of UVLO 170 during which time it is a logic zero. Therefore, the output of AND gate 175 is at logic one during this period turning ON the pre-charge circuit comprising resistor 152, NFET 159, and PFET 158. DCIN 231 acts to charge VSYS 139 via resistor R 152, PFET 158 and the body diode 210 across PFET 136. The output of comparator 161 is enabled by logic one at the output of timer 157 after its 2.0-second time out. If VSYS 139 has charged to more than 2 volts when output of timer 157 goes to logic one, then both inputs of OR gate 164 are low and the input of SD latch 165 is disabled and its output is logic zero enabling gate 162. When the output of timer 157 goes to logic one, NFET 154 turns ON and PFET 145 turns OFF. When NFET 154 turns ON, both PFETs 136 and 137 turn ON and DCIN 231 powers VSYS 139.

After a 2.0-second delay of timer 157 from power up (signal 208), the output of timer 157 goes to logic one and enables the output of comparator 161 via AND gate 163, enabling the short circuit protection circuit comprising SD latch 165 and AND gate 162. It also turns OFF the pre-charging NFET 159 by disabling AND gate 175. If there is a short-circuit fault in the system, then VSYS 139 will not rise at all and the output of comparator 161 will be high after timer 157 enables AND gate 163. When the output of comparator 161 goes to logic one, it causes the output of AND gate 163 to go to logic one. OR gate 164 then goes to logic one and triggers SD latch 165 turning ON LED 166 signaling a short-circuit condition. However, if there is no short-circuit condition, VSYS 139 will be charged up via R 152 and PFET 158 to above 2.0 volt after the 1.0-second of pre-charge time. The output of comparator 161 then goes to logic zero and SD latch 165 is not triggered. The output of AND gate 162 goes to logic one after the 2.0-second time turning OFF PFET 145 and turning ON NFET 154 and thus PFETs 136 and 137. The power source to VSYS 139 is switched from battery 144 to voltage DCIN 231.

If a reversed-polarity adapter is plugged into connector 131, a negative voltage will appear across R 142 and LED 143. The negative voltage causes LED 143 to turn ON. An ON LED 143 sends a visible signal to the user notifying the user of a fault condition. Additionally, diode 132 prevents capacitor 133 from being charged by a negative input voltage and clamping diode 151 prevents VSEN 171 from going below a negative 0.7 volt.

If DCIN 231 is a negative voltage, VCC 180 is not charged and IC 150 keeps power-up NFET 154 from turning ON as UVLO 170 will not be activated and signal 208 will not enable timers 157, 177 and SD latch 165. Since neither time 157 or 177 are activated, their outputs never transition to logic one and NFET 154 can never turn ON. PFET 145 is kept ON by the action of the voltage of battery 144 and pull-down resistor R 156.

A reversed-polarity alert circuit comprises a NPN transistor (T) 94, a blocking diode 143, a current-limiting resistor 92 and an inverter gate 93. The collector of T 94 is connected to the input of inverter gate 93 as well as to a system voltage 91 via resistor 92. Inverter gate 93 is also powered by voltage 91 provided by the host system, normally at 3.3 volts. The base of transistor 94 is connected to ground 201. The emitter of T 94 is connected to DCIN 231 via LED 143 and resistor 142.

In the event a reversed-polarity adapter (not shown) is plugged into connector 131, a negative voltage at DCIN 231 will force a base current IB 97 from ground through the base-emitter junction of transistor 94, diode 143, and resistor 142. IB 97 turns ON T 94 to saturation causing its collector to emitter voltage (VCE) to drop to less than 0.2 volts. Since the base to emitter (VBE) voltage drop of T 92 is at approximately 0.7 volts, the voltage at the emitter (VRV 98) of T 94 will be at negative 0.7 volts relative to ground 201, and the collector voltage (99) of T 94 is at approximately negative 0.5 volts relative to ground 201. Inverter gate 93 goes to logic one signaling reverse voltage alert (RVA) 95 to the host system (not shown). An electrostatic discharge (ESD) clamping diode 151 prevents the application of a negative voltage DCIN 231 from pulling VSEN 171 below approximately negative 0.7 volts relative to ground 201. IC 150 is not powered up if DCIN 231 is a negative voltage. However, in the event no adapter or an adapter with right polarity is plugged in, DCIN 231 will at a voltage greater than or equal to zero, in which case T 94 will not be turned ON and RVA 95 remains at logic zero.

On the other hand, if an adapter with a proper voltage range and polarity is plugged in, a pre-charge circuit comprising resistor 152 and PFET 158 are turned ON. If there is no short-circuit fault, NFET switches 154 and PFETs 136 and 137 are be turned ON and PFET 145 is turned OFF after two seconds from the initial power-up. The power source to the system is switched from battery 144 to the voltage DCIN 231.

Although the present invention and its advantages have been described in detail, it should be understood that various changes, substitutions and alterations can be made herein without departing from the spirit and scope of the invention as defined by the appended claims.

What is claimed is:

1. A power interface circuit for coupling an adapter output voltage from an adapter unit to a system power input of a system comprising:

switch circuitry for coupling said adapter output voltage to a said system power input in response to a first logic state of a first control signal;

a reference circuit for generating first and second reference voltages and a start timer signal in response to a polarity signal generated from said adapter output voltage;

a first timer circuit generating a first timer signal in response to a first logic state of said start timer signal, wherein said first timer output has a first logic state for a first time interval and a second logic state after said first time interval ends;

a second timer circuit generating a second timer signal in response to said first logic state of said start timer signal, wherein said second timer output has a first logic state for a second time interval and a second logic state after said second time interval ends;

circuitry for generating a power correct signal in response to said first and second reference voltages, a sense voltage corresponding to said adapter output voltage, and said first timer signal, said power correct signal having a first logic state if said adapter output voltage is within a voltage range set by said first and second reference voltages and said second timer signal has said second logic state; and logic circuitry receiving said power correct signal, said first timer signal, said second timer signal, and generating said first control signal and an out of range signal, wherein said first control signal has said first logic state if said out of range signal has a first logic state and said second timer signal has said second logic state.

2. The power interface circuit of claim 1, wherein said logic circuit further comprises a low voltage level circuit receiving said system power input and generating a low level signal, said low level signal having a first logic state if a system voltage of said system power input is below a predetermined low voltage level.

3. The power interface circuit of claim 2, wherein said logic circuit further comprises a shut down latch enabled by said first logic state of said start timer signal and generating said out of range signal, wherein said out of range signal has a first logic state if said power correct signal has said second logic state and said first timer signal has said second logic state or said second timer signal has said second logic state and said low level signal has said first logic state.

4. The power interface circuit of claim 1, wherein said switch circuitry comprises:
    a first electronic switch for coupling said adapter output voltage to a sense node in response to a first logic state of a gate control signal;
    a diode having an anode coupled to said adapter output voltage and a cathode coupled to said sense node;
    a second electronic switch for coupling said sense node to said system power input in response to said first logic state of said gate control signal; and
    a gate control circuit for generating said gate control signal in response to said first control signal.

5. The power interface circuit of claim 4, wherein said logic circuitry further comprises charge circuitry for coupling said sense node to said system power input in response to a first logic state of a third control signal, wherein said third control signal has said first logic state if said power signal has said first logic state and said second time output signal has said first logic state.

6. The power interface circuit of claim 4, wherein said gate control circuit comprises a third electronic switch that is gated ON generating said first logic state of said gate control signal when said first control signal has said first logic state.

7. The power interface circuit of claim 1, where said sense voltage is generated by a sense circuit comprising:
    a first resistor having a first terminal coupled to said adapter output voltage and a second terminal; and
    a second resistor having a first terminal coupled to said second terminal of said first resistor and a second terminal coupled to a ground potential, wherein said sense voltage is generated at said second terminal of said first resistor.

8. The power interface circuit of claim 5, wherein said charge circuitry comprises:
    a first resistor having a first terminal coupled to said sense node and a second terminal;
    a P type field effect transistor (PFET) having a source terminal coupled to said second terminal, a drain terminal coupled to said system power input and a gate terminal;
    a second resistor having a first terminal coupled to said gate terminal of said PFET and a second terminal; and
    a N type FET (NFET) having a drain terminal coupled to said second terminal of said second resistor, a source terminal coupled to a ground potential and a gate terminal coupled to said third control signal.

9. The power interface circuit of claim 4 further comprising a fourth electronic switch for coupling a battery supply unit to said system power input in response to said first logic state of said first control signal.

10. The interface circuit of claim 9, wherein said fourth electronic switch comprises:
    a resistor having a first terminal coupled to said first control signal and a second terminal coupled to a ground potential; and
    a PFET having a drain terminal coupled to an output of said battery unit, a source terminal coupled to said system power input, and a gate terminal coupled to said first terminal of said resistor, wherein an anode of a body diode of said PFET is coupled to said drain terminal and a cathode of said body diode is coupled to said source terminal.

11. The power interface circuit of claim 1, wherein said sense voltage is coupled to a cathode of a diode and an anode of said diode is coupled to a ground potential.

12. The power interface circuit of claim 1 further comprising a reverse voltage circuit coupled to said adapter output voltage for indicating said preferred polarity of said adapter output voltage.

13. The power interface circuit of claim 12, wherein said reverse voltage circuit comprises:
    a resistor having a first terminal coupled to said adapter output voltage and a second terminal; and
    a light emitting diode having an anode coupled to a first node and a cathode coupled to said second terminal of said resistor, said first light emitting diode indicating a reverse voltage condition when ON.

14. The power interface circuit of claim 1, wherein said out-of-range voltage is coupled to an anode of a light emitting diode having a cathode coupled to a ground potential, said light emitting diode indicating an out-of-range voltage condition when ON.

15. The power interface circuit of claim 13, wherein said first node is coupled to a ground potential.

16. The power interface circuit of claim 13, wherein said first node is coupled to a polarity circuit for generating a reverse voltage alert signal.

17. The power interface circuit of claim 16, wherein said polarity circuit comprises:
    a NPN transistor having an emitter terminal coupled to said first node, a base terminal coupled to a ground potential and a collector terminal;
    a sense resistor having a first terminal coupled to a power supply voltage and a second terminal coupled to said collector terminal; and
    an inverter logic gate powered by said power supply voltage and having an input coupled to said second terminal and an output generating said reverse voltage alert signal.

18. The power interface circuit of claim 17, wherein said reverse voltage alert signal is coupled to said system for notifying a user of said system of a reverse voltage condition.

19. A battery operated system comprising:
    a central electronics unit coupled to a system power input for powering said system;
    an adapter input for receiving an adapter output voltage from an alternating current (AC) adapter unit;

a power interface circuit for coupling an adapter output voltage of said AC adapter unit to said system power input, wherein said power interface circuit further comprises;
switch circuitry for coupling said adapter output voltage to a said system power input in response to a first logic state of a first control signal;
a reference circuit for generating first and second reference voltages and a start timer signal in response to a polarity signal generated from said adapter output voltage;
a first timer circuit generating a first timer signal in response to a first logic state of said start timer signal, wherein said first timer output has a first logic state for a first time interval and a second logic state after said first time interval ends;
a second timer circuit generating a second timer signal in response to said first logic state of said start timer signal, wherein said second timer output has a first logic state for a second time interval and a second logic state after said second time interval ends;
circuitry for generating a power correct signal in response to said first and second reference voltages, a sense voltage corresponding to said adapter output voltage, and said first timer signal, said power correct signal having a first logic state if said adapter output voltage is within a voltage range set by said first and second reference voltages and said second timer signal has said second logic state; and
logic circuitry receiving said power correct signal, said first timer signal, said second timer signal, and generating said first control signal and an out of range signal, wherein said first control signal has said first logic state if said out of range signal has a first logic state and said second timer signal has said second logic state.

20. The system of claim 19, wherein said logic circuit further comprises a low voltage level circuit receiving said system power input and generating a low level signal, said low level signal having a first logic state if a system voltage of said system power input is below a predetermined low voltage level.

21. The system of claim 20, wherein said logic circuit further comprises a shut down latch enabled by said first logic state of said start timer signal and generating said out of range signal, wherein said out of range signal has a first logic state if said power correct signal has said second logic state and said first timer signal has said second logic state or said second timer signal has said second logic state and said low level signal has said first logic state.

22. The system of claim 19, wherein said switch circuitry comprises:
a first electronic switch for coupling said adapter output voltage to a sense node in response to a first logic state of a gate control signal;
a diode having an anode coupled to said adapter output voltage and a cathode coupled to said sense node;
a second electronic switch for coupling said sense node to said system power input in response to said first logic state of said gate control signal; and
a gate control circuit for generating said gate control signal in response to said first control signal.

23. The system of claim 22, wherein said logic circuitry further comprises charge circuitry for coupling said sense node to said system power input in response to a first logic state of a third control signal, wherein said third control signal has said first logic state if said power signal has said first logic state and said second time output signal has said first logic state.

24. The system of claim 22, wherein said gate control circuit comprises a third electronic switch that is gated ON generating said first logic state of said gate control signal when said first control signal has said first logic state.

25. The system of claim 19, where said sense voltage is generated by a sense circuit comprising:
a first resistor having a first terminal coupled to said adapter output voltage and a second terminal; and
a second resistor having a first terminal coupled to said second terminal of said first resistor and a second terminal coupled to a ground potential, wherein said sense voltage is generated at said second terminal of said first resistor.

26. The system of claim 23, wherein said charge circuitry comprises:
a first resistor having a first terminal coupled to said sense node and a second terminal;
a P type field effect transistor (PFET) having a source terminal coupled to said second terminal, a drain terminal coupled to said system power input and a gate terminal;
a second resistor having a first terminal coupled to said gate terminal of said PFET and a second terminal; and
a N type FET (NFET) having a drain terminal coupled to said second terminal of said second resistor, a source terminal coupled to a ground potential and a gate terminal coupled to said third control signal.

27. The system of claim 22 further comprising a fourth electronic switch for coupling a battery supply unit to said system power input in response to said first logic state of said first control signal.

28. The system of claim 27, wherein said fourth electronic switch comprises:
a resistor having a first terminal coupled to said first control signal and a second terminal coupled to a ground potential; and
a PFET having a drain terminal coupled to an output of said battery unit, a source terminal coupled to said system power input, and a gate terminal coupled to said first terminal of said resistor, wherein an anode of a body diode of said PFET is coupled to said drain terminal and a cathode of said body diode is coupled to said source terminal.

29. The system of claim 19, wherein said sense voltage is coupled to a cathode of a diode and an anode of said diode is coupled to a ground potential.

30. The system of claim 19 further comprising a reverse voltage circuit coupled to said adapter output voltage for indicating said preferred polarity of said adapter output voltage.

31. The system of claim 30, wherein said reverse voltage circuit comprises:
a resistor having a first terminal coupled to said adapter output voltage and a second terminal; and
a light emitting diode having an anode coupled to a first node and a cathode coupled to said second terminal of said resistor, said first light emitting diode indicating a reverse voltage condition when ON.

32. The system of claim 19, wherein said out-of-range voltage is coupled to an anode of a light emitting diode having a cathode coupled to a ground potential, said light emitting diode indicating an out-of-range voltage condition when ON.

33. The system of claim 31, wherein said first node is coupled to a ground potential.

34. The system of claim 31, wherein said first node is coupled to a polarity circuit for generating a reverse voltage alert signal.

35. The system of claim 34, wherein said polarity circuit comprises:
- a NPN transistor having an emitter terminal coupled to said first node, a base terminal coupled to a ground potential and a collector terminal;
- a sense resistor having a first terminal coupled to a power supply voltage and a second terminal coupled to said collector terminal; and
- an inverter logic gate powered by said power supply voltage and having an input coupled to said second terminal and an output generating said reverse voltage alert signal.

36. The system of claim 35, wherein said reverse voltage alert signal is coupled to said system for notifying a user of said system of a reverse voltage condition.

* * * * *